US008108849B2

United States Patent
Adolphson et al.

(10) Patent No.: US 8,108,849 B2
(45) Date of Patent: *Jan. 31, 2012

(54) METHOD AND APPARATUS FOR GENERATING COMPUTER PROGRAMMING CODE SELECTIVELY OPTIMIZED FOR EXECUTION PERFORMANCE AND NOT OPTIMIZED FOR SERVICEABILITY

(75) Inventors: John Michael Adolphson, Rochester, MN (US); Cary Lee Bates, Rochester, MN (US); Paul Reuben Day, Rochester, MN (US); Steven Gene Halverson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1180 days.

This patent is subject to a terminal disclaimer.

(21) Appl. No.: 11/851,628

(22) Filed: Sep. 7, 2007

(65) Prior Publication Data

US 2007/0300213 A1    Dec. 27, 2007

Related U.S. Application Data

(63) Continuation of application No. 10/616,547, filed on Jul. 10, 2003, now Pat. No. 7,367,023.

(51) Int. Cl.
*G06F 9/45* (2006.01)
(52) U.S. Cl. .......................... 717/152; 717/151
(58) Field of Classification Search .......... 717/124–135, 717/151–161
See application file for complete search history.

(56) References Cited

U.S. PATENT DOCUMENTS

| | | | |
|---|---|---|---|
| 5,396,631 A * | 3/1995 | Hayashi et al. | 717/159 |
| 5,586,020 A * | 12/1996 | Isozaki | 717/159 |
| 5,655,122 A * | 8/1997 | Wu | 717/152 |
| 6,085,035 A * | 7/2000 | Ungar | 717/116 |
| 6,223,337 B1 | 4/2001 | Blume | |
| 6,263,489 B1 * | 7/2001 | Olsen et al. | 717/129 |
| 6,311,324 B1 | 10/2001 | Smith et al. | |
| 6,427,234 B1 | 7/2002 | Chambers et al. | |
| 6,434,741 B1 * | 8/2002 | Mirani et al. | 717/124 |
| 6,499,137 B1 | 12/2002 | Hunt | |
| 6,526,572 B1 * | 2/2003 | Brauch et al. | 717/154 |
| 6,553,565 B2 * | 4/2003 | Click et al. | 717/129 |
| 6,658,656 B1 * | 12/2003 | Thompson | 717/151 |
| 6,728,954 B1 * | 4/2004 | Kesselman et al. | 717/154 |
| 6,795,963 B1 * | 9/2004 | Andersen et al. | 717/130 |
| 6,820,258 B1 * | 11/2004 | Fink et al. | 717/158 |
| 6,938,249 B2 | 8/2005 | Roediger et al. | |
| 6,981,248 B2 | 12/2005 | Bates et al. | |
| 6,993,755 B1 * | 1/2006 | Ungar | 717/158 |
| 7,086,043 B2 | 8/2006 | Roediger et al. | |

(Continued)

OTHER PUBLICATIONS

Sajaniemi, Jorma, "Visualizing Roles of Variables to Novice Programmers," Jun. 2002, Brunel University, p. 111-127.*

(Continued)

*Primary Examiner* — Anna Deng
*Assistant Examiner* — Qing Chen
(74) *Attorney, Agent, or Firm* — Roy W. Truelson

(57) ABSTRACT

A compiler has the capability to selectively compile individual portions of a compilable code module for optimum execution performance or for serviceability. In one aspect, individual portions, such as procedures (being less than the entire module) are selectively optimized. In another aspect, debug activity data is used for determining whether or not to optimize compiled code. It is optionally possible to support one or more levels of partial selective optimization.

14 Claims, 8 Drawing Sheets

U.S. PATENT DOCUMENTS

| | | |
|---|---|---|
| 7,086,046 B2 * | 8/2006 | Barsness et al. .............. 717/152 |
| 7,287,246 B2 * | 10/2007 | Tan et al. ...................... 717/129 |
| 7,698,696 B2 * | 4/2010 | Ogawa et al. ................. 717/151 |
| 2002/0100018 A1 * | 7/2002 | Click et al. .................... 717/124 |
| 2003/0023961 A1 * | 1/2003 | Barsness et al. .............. 717/152 |
| 2003/0051234 A1 | 3/2003 | Schmidt |
| 2003/0061599 A1 * | 3/2003 | Bates et al. ................... 717/129 |
| 2003/0154466 A1 * | 8/2003 | Snider ........................... 717/138 |
| 2004/0034814 A1 * | 2/2004 | Thompson ..................... 714/35 |
| 2004/0098713 A1 * | 5/2004 | Ogawa et al. ................. 717/160 |
| 2004/0199904 A1 | 10/2004 | Schmidt |
| 2004/0221281 A1 * | 11/2004 | Suganuma ..................... 717/151 |

OTHER PUBLICATIONS

W. J. Schmidt et al., "Profile-Directed Restructuring of Operating System Code", IBM Systems Journal, vol. 37, No. 2, pp. 270-297 (1998).

* cited by examiner

METHOD AND APPARATUS FOR GENERATING COMPUTER PROGRAMMING CODE SELECTIVELY OPTIMIZED FOR EXECUTION PERFORMANCE AND NOT OPTIMIZED FOR SERVICEABILITY

CROSS REFERENCE TO RELATED APPLICATION

This is a continuation application of U.S. patent application Ser. No. 10/616,547, filed Jul. 10, 2003, entitled "Method and Apparatus for Generating Computer Programming Code Selectively Optimized for Execution Performance and Not Optimized for Serviceability", which is herein incorporated by reference. This application claims priority under 35 U.S.C. §120 of U.S. patent application Ser. No. 10/616,547, filed Jul. 10, 2003.

FIELD OF THE INVENTION

The present invention relates to digital data processing, and in particular to methods and apparatus for compiling or otherwise generating executable computer programming code.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and direct the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but using software having enhanced function, along with faster hardware.

In the very early history of the digital computer, computer programs which instructed the computer to perform some task were written in a form directly executable by the computer's processor. Such programs were very difficult for a human to write, understand and maintain, even when performing relatively simple tasks. As the number and complexity of such programs grew, this method became clearly unworkable. As a result, alternate forms of creating and executing computer software were developed.

The evolution of computer software has led to the creation of sophisticated software development environments. These environments typically contain a range of tools for supporting the development of software in one or more high-level languages. For example, interactive source editors support the initial generation of source code by a developer. Source databases may support collections of source modules or source objects, which serve as the component parts of software applications. Front-end compiler/debuggers perform simple semantic verification of the source and reduction to a standard form. Back-end or optimizing compilers generate machine executable object code from the standard form, and may optimize the performance of this code using any of various optimization techniques. Build utilities assemble multiple object code modules into fully functioning computer programs.

Among the tools available in many such programming development environments are a range of diagnostic and debug tools. Although source editors and compilers used during the initial creation and compilation phases of development can identify certain obvious inconsistencies in source code and produce object code conforming to the source, they can not necessarily verify more subtle flaws in the logic of a program itself, or determine that the program makes use of available resources in an efficient manner. This is generally accomplished by observing the behavior of the program at "run-time", i.e., when executed under real or simulated input conditions. Various trace tools exist which collect data concerning the run-time behavior of a computer program. Such tools may optionally trigger break points in the programming code, at which execution of the program is suspended and machine state can be examined. Analytical debug tools assist the programmer in analyzing the trace data after the fact, or machine state during program suspension, to find logical errors, inefficiencies, or other problems with the code.

When analyzing trace data or machine state, the programmer generally needs to associate executable object code with source code. I.e., the programmer will want to know which executable instruction or instructions correspond to some particular source code statement, which memory locations correspond to key variables in the source code, the location of stacks corresponding to called procedures, and so forth. Data necessary for making these associations is typically generated in the compilation process. E.g., compilation listings can be generated which correlate executable instructions with the source code statements upon which they are based. Program traces of dynamically allocated memory spaces can similarly be related back to the executable instructions, and the source code statements, causing particular actions.

For optimum analytical and debugging capability, it is preferable to have a simple, direct correspondence between object code and source code. I.e., the easiest object code to analyze using conventional debug tools is code such that for every source code statement, there is a discrete, contiguous sequences of executable instructions in the object code which correspond to it. Furthermore, debug analysis is facilitated if each segment of executable instructions corresponding to a source code statement writes any affected variables to memory, for this guarantees that the debug tools can find the current value of the variables in their respective memory locations.

Unfortunately, what is preferable from the standpoint of analytical and debugging capability ("serviceability") is not always preferable from the standpoint of optimum execution performance. In order to produce code which executes in as efficient a manner as possible, so-called "optimizing compilers" are frequently used to generate the executable object code from source. An optimizing or other compiler may produce performance optimizations, such as (a) changing the order of operations; (b) leaving frequently-used variables in registers without loading and dumping their values to memory; (c) holding partial mathematical expressions in registers for use in later instructions; (d) removing procedure calls by in-lining; (e) removing unused code branches and branch statements; and various others. As a result of performance optimizations performed by an optimizing compiler, the resulting object code may not have the same correspondence to the source code. In fact, it may bear almost no resemblance to the source, and the object code instructions corresponding to any particular source code statement may be non-contiguous, non-recognizable, or even non-existent. As a result, the capability to analyze and debug executable code generated by an optimizing compiler is often very limited.

Because it is known that executable code produced by an optimizing compiler is difficult to analyze and debug, program developers typically produce non-optimized code during the initial development process, and render the code in optimized form at a later stage in the process, when it is believed that most of the defects have been cured. For this purpose, various conventional optimizing compilers have the capability to turn optimizing off or on at the program developer's option. But despite best efforts of the developers, there will be some defects which manifest themselves only after the code has been distributed to end users and has been operating in the end users' environments. Because this code is typically generated by an optimizing compiler, analysis of problems occurring in the end user's environment is difficult.

It would, of course, be possible to simply provide the end user with code which has not been subjected to optimizing techniques, but this is likely to result in noticeably worse execution performance, to the point where it may affect the acceptability of the product from the point of view of the end user.

As programs grow in size and complexity, the task of analyzing and debugging programming code, and particularly servicing programming code after installation in the end user's environment, becomes increasingly difficult. A need exists for improved methods and techniques for servicing computer programming code, without unduly degrading execution performance.

SUMMARY OF THE INVENTION

A programming code compiler has the capability to selectively compile individual portions of a compilable code module for optimum execution performance or for serviceability. In one aspect of the present invention, individual portions of a compilable code module (being less than the entire module) are selectively optimized. In another aspect of the present invention, debug activity data is used for determining whether or not to optimize compiled code or portions of code.

The granularity of code portions being selectively optimized could vary. In the preferred embodiment, the compiler selectively optimizes functional blocks of code, such as each called procedure, function or method, but granularity could be greater or lesser. For example, the compiler might alternatively make the decision to selectively optimize individual basic blocks of code.

In the preferred embodiment, in addition to source code in any conventional form, selective optimization data is input to the compiler indicating portions of code to be optimized. For each individual code portion capable of selective optimization, the compiler uses the selective optimization data to determine whether or not the portion should be optimized. If the portion is to be optimized, the source statements within the block are rendered in object code form using any or all of various optimization techniques, including, but not necessarily limited to, the reordering of the order of execution of instructions, caching partial mathematical expressions in registers, removing dead code paths, and so forth. If the block is not to be optimized, at least some, and preferably most, optimizations are disabled for the code portion. Specifically, it is preferred that each source statement is rendered in object code form as a contiguous sequence of executable instructions which can be mapped one-to-one to the corresponding source code statement, and is not combined with other source statements for optimization purposes, although optimizations might be performed on multiple executable instructions within a single source code statement. Furthermore, for non-optimized code portions, all declared variables appearing in the source code are preserved, whether actually used or not.

In the preferred embodiment, the selective optimization data comprises both usage profile data indicating the typical frequency of use of each code portion during execution, and debug history data indicating the level of debug activity associated with each code portions. This selective optimization data can be either analytically or empirically derived. I.e., the programmer might decide which code sections are likely to be hot and input this information as usage profile data to the compiler. Alternatively, usage profile data can be collected under actual or simulated usage conditions, and this data can be input to the compiler. A combination of these techniques could also be used. Debug history data could be measured in a variety of ways, and using multiple different measurements. Specifically, debug history data could include considerations such as the frequency of exceptions taken in a particular code portion, the frequency of break conditions triggered, frequency or location of variables examined, and/or the frequency of code changes.

In a further alternative embodiment, it would be possible to support one or more levels of partial optimization, to be applied to code portions for which the selective optimization criteria are intermediate those of fully optimized code and non-optimized code.

The underlying theory of selective optimization is that a relatively small portion of the code accounts for the bulk of execution time. If this small portion is optimized for performance, and the remaining code is non-optimized (and therefore readily serviceable with available analytical and debug tools), the resulting compiled program module will be both almost as fast as a fully optimized program module, and almost as serviceable as one in which no optimizations are performed.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
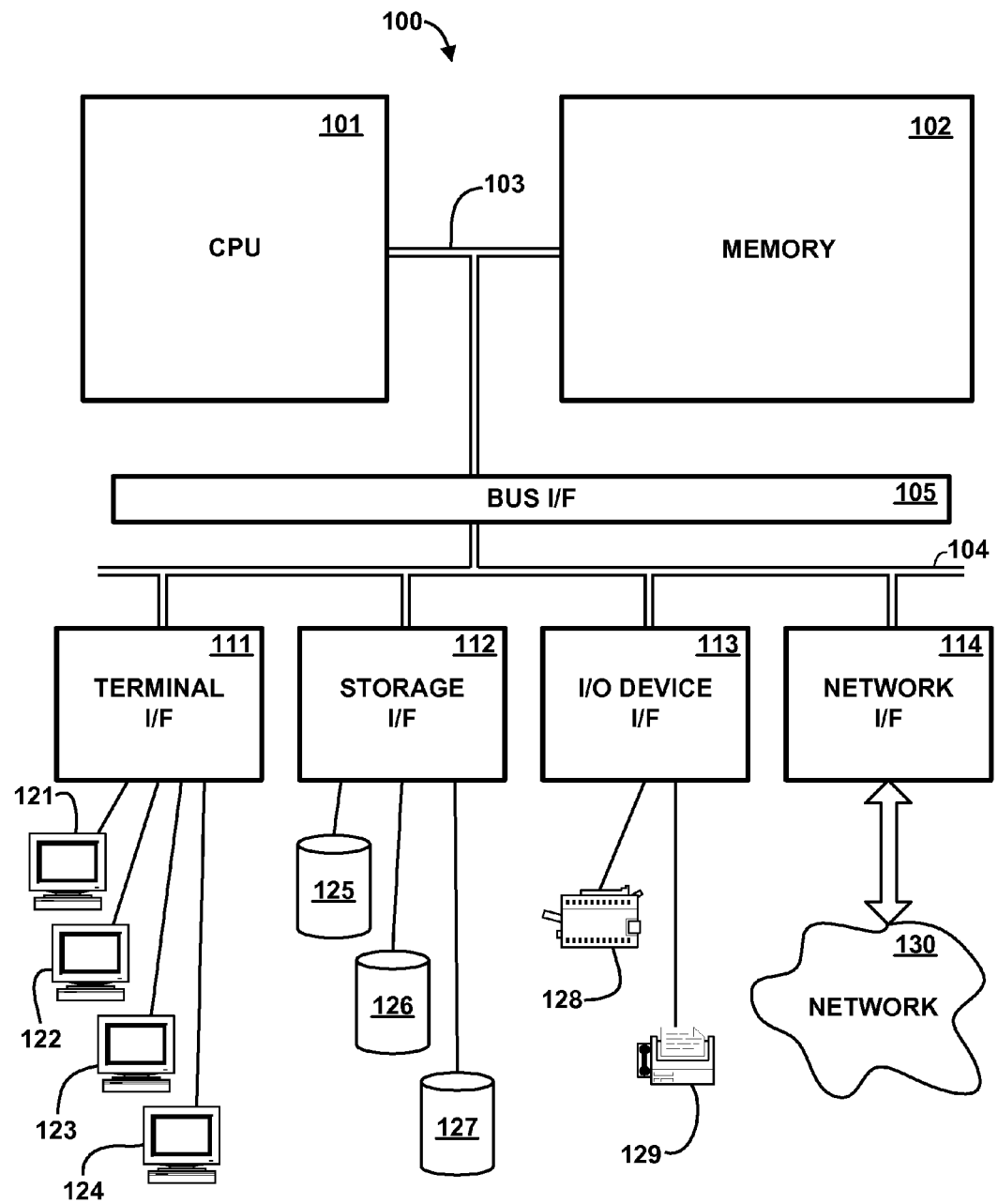
FIG. 1 is a high-level block diagram of the major hardware components of a computer system for developing and compiling programming code, according to the preferred embodiment of the present invention.

Referring to the Drawing, wherein like numbers denote like parts throughout the several views, FIG. 1 is a high-level representation of the major hardware components of a computer system 100 for developing and compiling programming code, according to the preferred embodiment of the present invention. CPU 101 is a general-purpose programmable processor which executes instructions and processes data from main memory 102. Main memory 102 is preferably a random access memory using any of various memory technologies, in which data is loaded from storage or otherwise for processing by CPU 101.

Memory bus 103 provides a data communication path for transferring data among CPU 101, main memory 102 and I/O bus interface unit 105. I/O bus interface 105 is further coupled to system I/O bus 104 for transferring data to and from various I/O units. I/O bus interface 105 communicates with multiple I/O interface units 111-114, which may also be known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to an external network 130 for communication with one or more other digital devices. Network 130 may be any of various local or wide area networks known in the art. For example, network 130 may be an Ethernet local area network, or it may be the Internet. Additionally, network interface 114 might support connection to multiple networks.

It should be understood that FIG. 1 is intended to depict the representative major components of system 100 at a high level, that individual components may have greater complexity than represented in FIG. 1, that components other than or in addition to those shown in FIG. 1 may be present, and that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among CPU 101, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicated with system 100 over network 130. Computer system 100 may alternatively be a single-user system, typically containing only a single user display and keyboard input.

While various system components have been described and shown at a high level, it should be understood that a typical computer system contains many other components not shown, which are not essential to an understanding of the present invention. In the preferred embodiment, computer system 100 is a computer system based on the IBM AS/400™ or i/Series™ architecture, it being understood that the present invention could be implemented on other computer systems.

Figure 2:
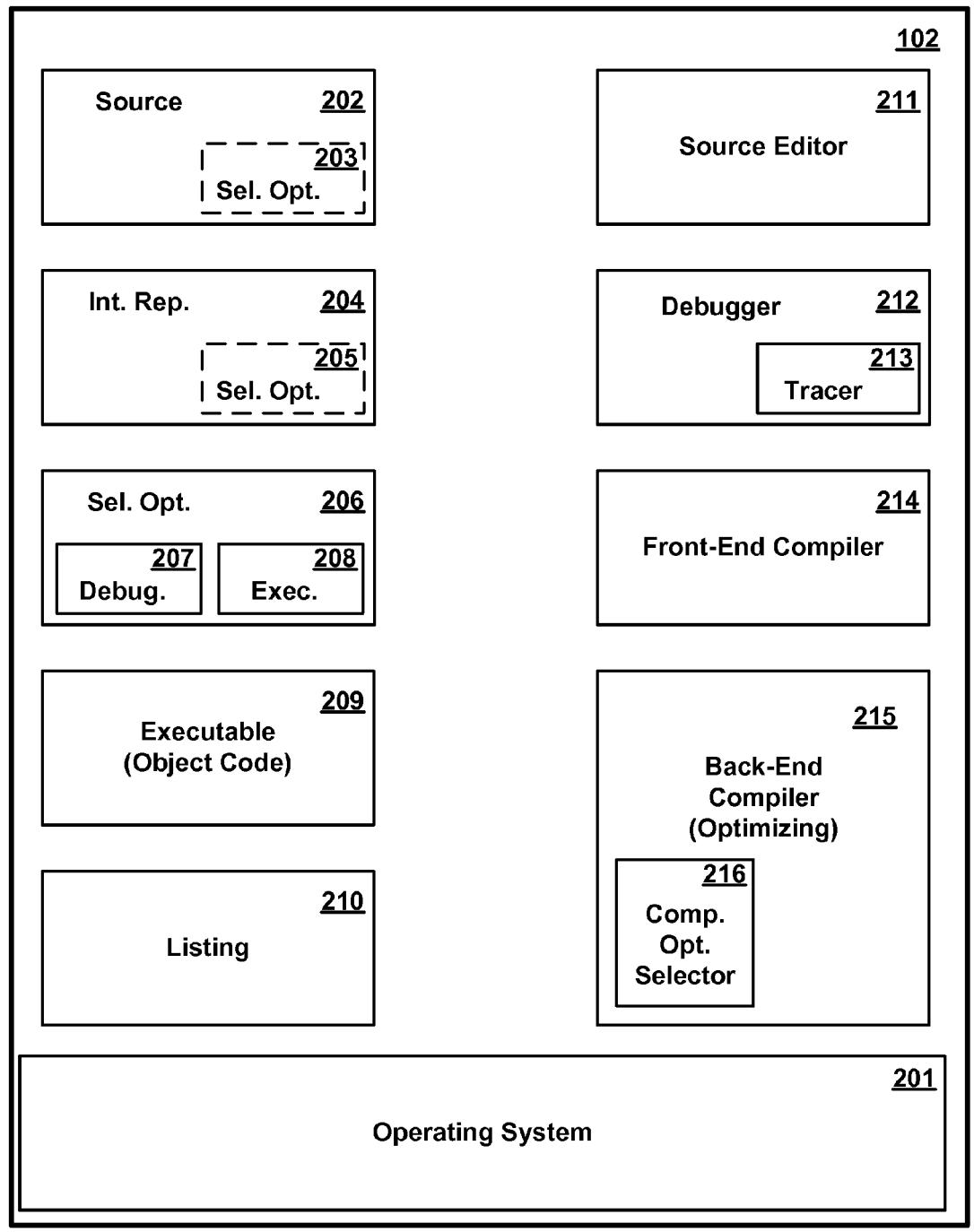
FIG. 2 is a conceptual illustration of the major software components of a computer system for developing and compiling code, according to the preferred embodiment.

FIG. 2 is a conceptual illustration of the major software components of system 100 in memory 102. Operating system kernel 201 provides various low-level software functions, such as device interfaces, management of memory pages, management and dispatching of multiple tasks, and so forth, as is well-known in the art. Various programs such as source editor 211, debugger 212, front-end compiler 214 and back-end compiler 215 produce executable program code from code written in a source form, which is generally human-readable source. Depicted in FIG. 2 are a single source module 202, intermediate representation module 204, and executable object code module 209, intended to represent corresponding modules, i.e., object code module 209 is produced from intermediate module 204, which is in turn produced from source module 202.

Source editor 211 is an executable computer program which supports the creation and editing of source code for other computer programs, using any of various known techniques. Source file 202 represents a file containing source code, which is created and edited using source editor 211. Source editor 211 could be a general-purpose text editor which is non-specific to a programming language and has no diagnostic capabilities, or could be a special-purpose source editor (typically for a particular high-level language) having built-in diagnostic support features, as are known in the art. Debugger 212 is an executable program which is used to assist the programmer in analyzing computer programming code for defects, typically by displaying source code and state information during execution of a program.

Front-end compiler 214 is an executable program which converts source file 202 to an intermediate representation 204. Intermediate representations may take any of various forms, but typically they provide some form of commonality between different source or object forms. I.e., source code written in different forms may be compiled by different front-end compilers to a common intermediate form for further compilation by a common back-end compiler. Alternatively, source code may be compiled by a single front-end compiler to a common intermediate form for use on different hardware platforms, the common intermediate form being then compiled by different back-end compilers associated with different respective hardware. Back-end compiler 215 is an executable computer program which compiles the intermediate representation 204 into an object code module 209 of executable statements. Back-end compiler 215 has the capability to perform certain optimizations on all, none, or selective portions of an object code module 209. Component optimization selector 216 controls the selection of individual component portions of a compilable module for optimization, as described more fully herein. When performing a compilation, back-end compiler has the capability to produce compiler listing 210, which correlates instructions and variable locations in the executable object code with statements and variables in the intermediate representation 204 or source representation 202.

Component optimization selector 216 preferably makes determinations whether to optimize particular portions of an executable module based on selective optimization data 206, comprising debug activity data 207 and execution profile data 208. Debug activity data 207 contains information relating to debug activity occurring in different portions of code module 209. Specifically, in the preferred embodiment, debug activity data includes historical data such as the frequency of break points triggered, frequency of exceptions, and variables examined during debug, as described more fully herein; however, debug activity data could include other or additional data, some examples of which are given herein. In the preferred embodiment, debug data is obtained using activity tracer 213 embedded within debugger 212. Activity tracer 213 automatically records certain debug activity with respect to object module 209. Alternatively, it would be possible for program developers to manually record certain debug activity. Selective optimization data optionally includes some selective optimization data 203 embedded within source file 202, from which front end compiler further generates embedded selective optimization data 205 within intermediate representation 204. Optional selective optimization data 203 could include, e.g., explicit programmer directions to optimize or not to optimize particular portions of compilable source module 202, which could override selection criteria based on other selective optimization data, such as debug activity data 207 or execution profile data 208.

Although source editor 211 and debugger 212 are shown as separate program entities in FIG. 2, it will be understood that the functions performed by these programs might be performed by a single unified program, and/or that certain functions might be combined with other programs, such as debug functions combined with front-end compiler or back-end compiler. Furthermore, while source editor 211, debugger 212, front-end compiler 214, and back-end compiler 215 are shown as separate entities, it will be understood that these are often packaged together as part of an integrated application development environment. It will be further understood that in some programming development environments, there is no intermediate code representation, and front-end compiler 214 and back-end compiler 215 are effectively merged. There could alternatively be multiple levels of intermediate representation. Furthermore, it will be appreciated that some or all of these functions may be incorporated into an operating system. Additionally, although functional modules 211-216 are depicted in FIG. 2 on a single computer system 100 for completeness of the representation, it is not necessarily true that all functions will be present on a single computer system or will be performed on a single computer system. For example, editing of source code may be performed by source editors located in a distributed manner in individual workstations, while compiling and analysis of code might be performed by a centralized server.

A module which is a unit of compilation is shown and described herein. Only a single compilable source module 202, intermediate representation module 204, and executable object code module 209 are shown in FIG. 2 for clarity of illustration. It will be understood, however, that a typical programming development environment may contain many modules of each type, and that multiple executable object code modules may be further combined in a build process to produce a single program which is distributed to end users. It will further be understood that many other program and data entities may be present in a complex program development environment, and that the number of such entities is typically much larger than represented in FIG. 2. Furthermore, it will be understood that various entities could be stored in a distributed fashion on multiple computer systems.

While the software components of FIG. 2 are shown conceptually as residing in memory 102, it will be understood that in general the memory of a computer system will be too small to hold all programs and other data simultaneously, and that information is typically stored in data storage devices 125-127, comprising one or more mass storage devices such as rotating magnetic disk drives, and that the information is paged into memory by the operating system as required. Furthermore, it will be understood that the conceptual representation of FIG. 2 is not meant to imply any particular memory organizational model, and that system 100 might employ a single address space virtual memory, or might employ multiple virtual address spaces which overlap.

In general, complex computer programming code is developed in a hierarchical and iterative process, wherein the programming project is initially broken down into various components, individual programmers write code for the components, the code for individual components is tested iteratively in a debug phase until it is deemed sufficiently reliable, and individual components are then merged with other components and retested and debugged. At any given stage of development, a process will be used for generating executable instructions to perform the function of the program, and this process will not necessarily be the same for all stages of development. At some point, generally before distribution to the end users, the program developers will wish to generate optimized, compiled code using an optimizing compiler.

In accordance with the preferred embodiment, selective optimization data 206 is gathered during various activities as part of the development process. Selective optimization data preferably includes both debug activity data 207 and execution profile data 208. Selective optimization data 206 is used by back-end compiler 215 to determine whether and to what extent to optimize different component portions of intermediate representation module 204.

Figure 3:
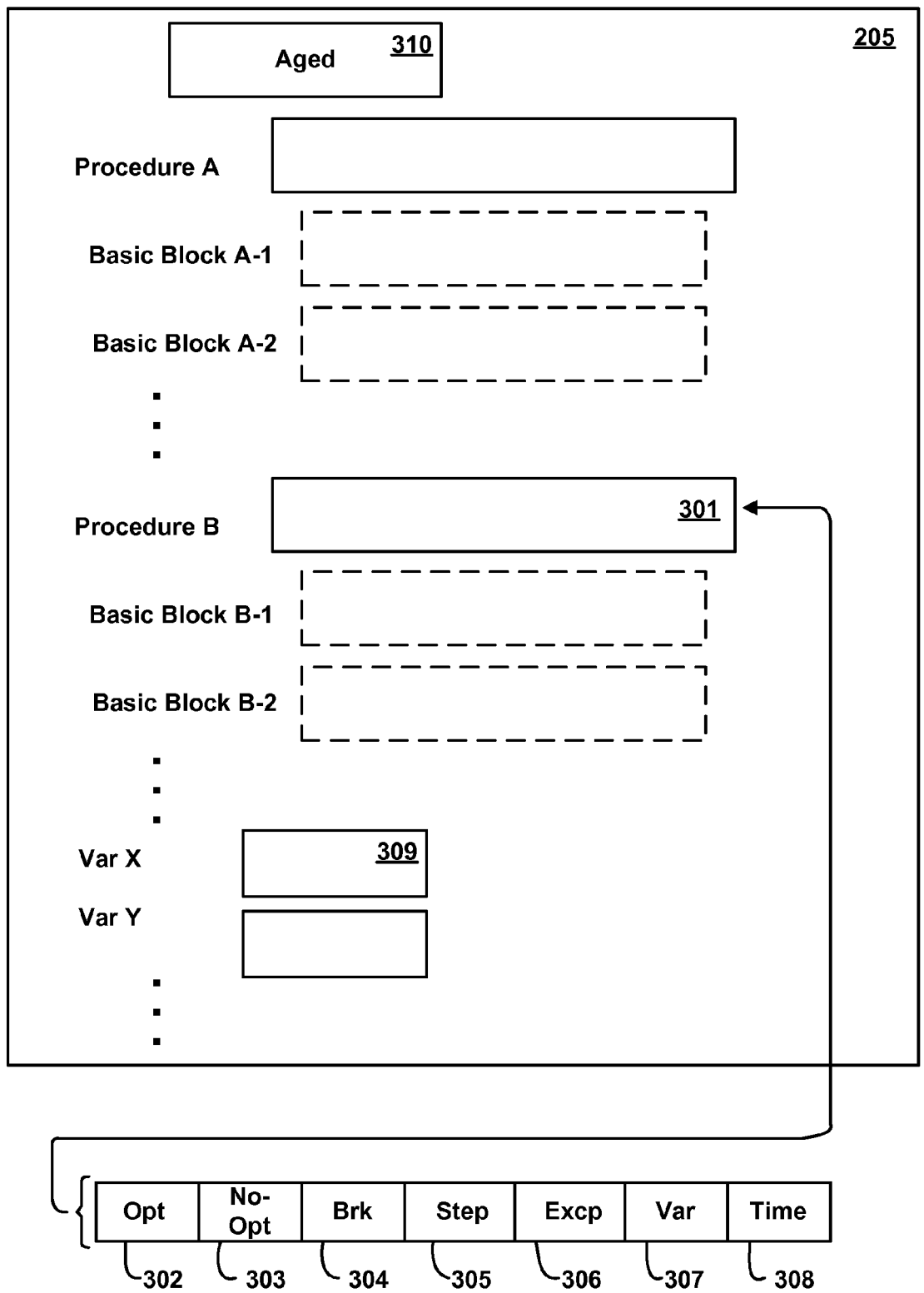
FIG. 3 is a conceptual representation of selective optimization data, according to the preferred embodiment.

FIG. 3 is a conceptual representation of selective optimization data 206, according to the preferred embodiment. As shown in FIG. 3, certain data used for making selective optimization decisions is maintained with respect to each component portion of the programming code generated from source module 202. In the preferred embodiment, the granularity of the component portions is a procedure, function, method or similar programming construct (herein referred to as a "procedure", however named in the applicable programming language and environment). Each procedure contains at least one, and usually more than one, basic blocks of code. A basic block is a set of consecutive instructions which are always executed together (in the absence of exception conditions), i.e., a basic block has only a single entry and a single exit point, and upon entering the basic block at the entry point, all instructions in the block will be executed to and including the instruction at the exit point. Compiler 215 generates a mapping of basic blocks as part of the compilation process, which can be saved in selective optimization data 206, or in some other data structure to which selective optimization data makes reference.

As shown in FIG. 3, a component optimization record 301 is associated with each procedure in source module 202. Component optimization record comprises a force optimization flag 302, suppress optimization flag 303, break counter 304, step counter 305, exception counter 306, variable visualization counter 307, and execution time field 308. Force optimization flag 302 and suppress optimization flag 303 either force the compiler to optimize the procedure or suppress optimization of the procedure, respectively, without regard to the values of the other fields, and are used to manually override the selective optimization decision otherwise made by component optimization selector 216 in back-end compiler 215. Break counter 304 records a number reflecting the frequency with which a break point a break point within the procedure was triggered during debug operations; this number could be a simple count of the number of such occurrences, or could be weighted according to various factors such as the user causing break point execution, the age of the data, etc. Step counter 305 similarly records a number reflecting the frequency of a stepping operation during debug executing at least one instruction in the procedure. Exception counter 306 similarly records a number reflecting the frequency of exceptions triggered within the procedure. Variable visualization counter 307 similarly records a number reflecting the frequency with which a programmer performing debug operations examined the state of at least one variable in the procedure.

Execution time field 308 is a relative measure of average time spent executing instructions of the procedure during program execution. Execution time field 308 might represent a direct measurement of time, such as number of clock cycles or other units of time, or it might represent a more indirect measurement. For example, it could be an instruction count, a count of basic block executions, or similar. While these are not direct measurements of time (since not all instructions or basic blocks execute in the same amount of time), they are roughly proportional to execution time over a large number of instructions or basic block executions, and are sufficiently accurate for purposes of the present invention. Such indirect measurements may be easier to obtain, depending on the development environment.

Additionally, a variable visualization counter 309 is associated with each variable, the visualization counter 309 recording the frequency with which a programmer performing debug operations examined the state of the corresponding variable.

In the preferred embodiment, debug activity data 207 comprises fields 304, 305, 306, 307, and 309, while execution profile data 208 comprises field 308. However, it will be appreciated that other or additional data could be used to record debug activity or execution times.

In the preferred embodiment, selective optimization data in the form of an optimization record 301 exists for each procedure. However, it would alternatively or additionally be possible to record data on a more granular basis, e.g., to maintain a separate optimization record 301 for each basic block (as represented in FIG. 3 by dashed record blocks).

Selective optimization data 206 further includes an aged field 310, which is a date/time stamp recording when certain counters were last aged. As described herein, certain data is periodically aged so that more recent events have a greater relative significance.

It should be understood that FIG. 3 is a conceptual illustration for purposes of explaining the gathering and use of selective optimization data, and that the actual structure such data may vary, and will typically be more complex. The following variations are mentioned in particular, by way of example and not by way of limitation. Data may be stored in different locations, e.g., flags 302 and 303 may be contained in the source code itself. Other or additional data may be stored with selective optimization data described herein. Optimization data 206 may include headers, indexes, pointers or similar constructs necessary to find relevant entries. Furthermore, optimization data 206 generally includes some construct for identifying procedures and variables to which the data pertains. This could include pointers or other references to the source module 202, object module 209 or listing 210.

Various conventional techniques exist for gathering execution profile data and using this data in an optimizing compiler to make certain determinations affecting ultimate code performance, such as structuring the order in which instruction paths occur in the executable module to reduce the frequency of long branches. Essentially the same execution profile data could be used to make selective optimization decisions as described herein. Execution time field 308 is a representation of such data or any value derived from it. A techniques for gathering execution profile data is described in commonly assigned copending U.S. patent application Ser. No. 10/406,552 to Schmidt, filed Apr. 3, 2003, which is herein incorporated by reference. For a general discussion of code optimization using profile data, see Schmidt et al, "Profile-Directed Restructuring of Operating System Code", IBM Systems Journal, vol. 37. No. 2, p. 270-297 (1998). Additional such techniques are disclosed in the following U.S. patents and patent applications, all of which are herein incorporated by reference: U.S. Pat. No. 5,950,009 to Bortnikov et al.; commonly assigned U.S. patent application Ser. No. 09/948,749, filed Sep. 7, 2001, to Schmidt; commonly assigned U.S. patent application Ser. No. 09/992,324, filed Nov. 19, 2001, to Roediger et al.; and commonly assigned U.S. patent application Ser. No. 10/282,811, filed Oct. 29, 2002, to Roediger et al.

Figure 4A:
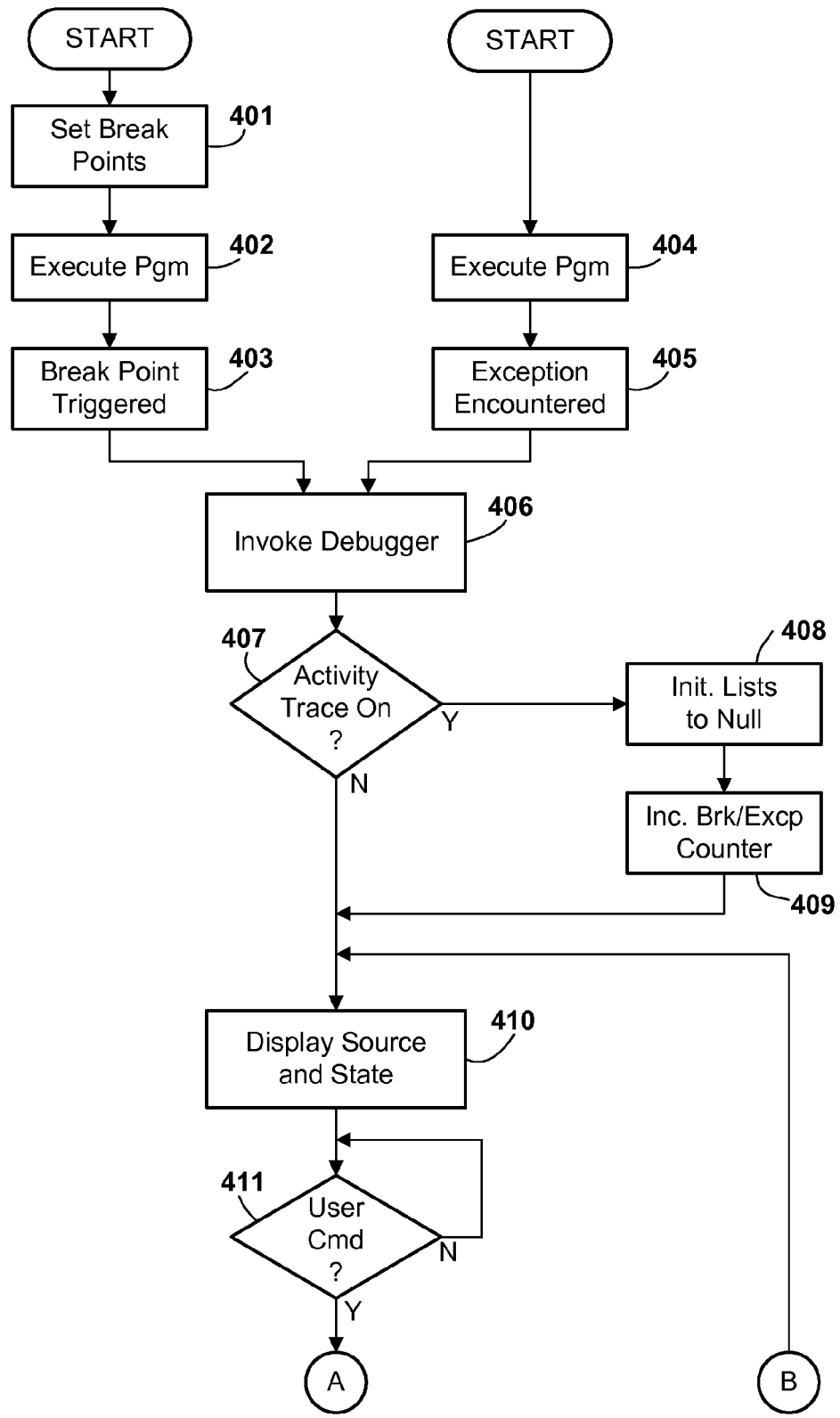
FIGS. 4A, 4B and 4C (herein collectively referred to as FIG. 4) are a high-level flow diagram showing the overall process of using a debugger and generating debug activity data, according to the preferred embodiment.
Figure 4B:
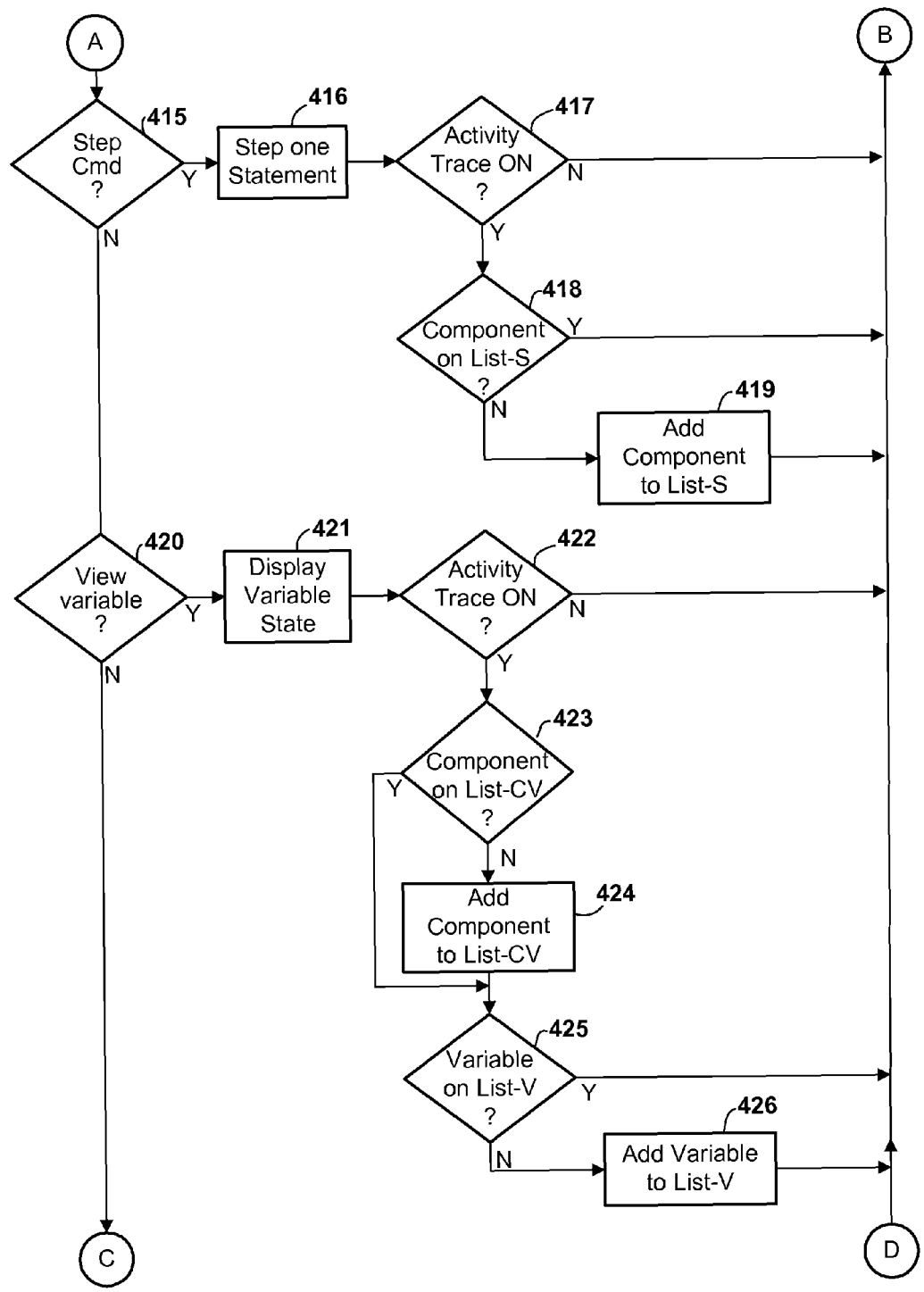
Figure 4C:
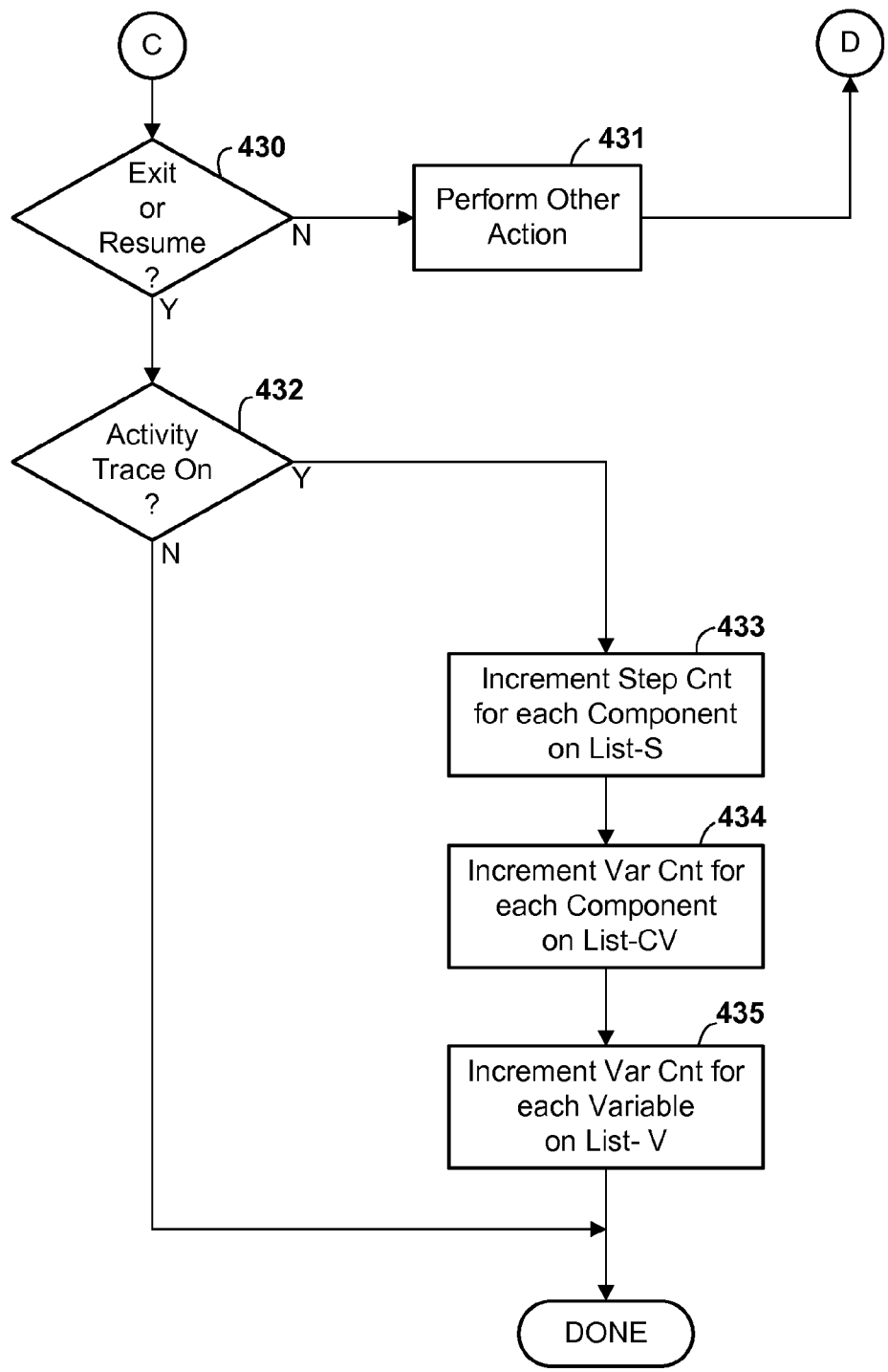

In the preferred embodiment, debug activity data 207 is automatically collected while using debugger 212 by embedded activity tracer 213 within the debugger. FIGS. 4A, 4B and 4C (herein collectively referred to as FIG. 4) are a high-level flow diagram showing the overall process of using debugger 212 and generating debug activity data, according to the preferred embodiment.

Debugger 212 is typically invoked for analysis of machine state when a break point is triggered, or when an exception is encountered, illustrated in FIG. 4 as two separate starting branches. In the former case, a user (usually a development programmer) first sets one or more break points in the program to be debugged (step 401), and executes the program (step 402), until a break point is triggered (step 403). In the latter case, the program is executed (step 404) until an exception is encountered (step 405), which may or may not have been expected by the programmer.

Upon the occurrence of either the break point trigger or the exception, the debugger 212 is invoked to examine program state and analyze the program (step 406). When the debugger is invoked, an activity trace flag will be set to on or off. The activity trace flag determines whether activities of the programmer when using the debugger should be "traced", i.e., accumulated as debug activity data 207 for later use in making selective optimization decisions in the compiler. Any conventional mechanism may be used for setting the flag. For example, each programmer with access to the debugger might have an associated profile for using the debugger, which would indicate a default flag setting for that programmer. Programmers having maintenance responsibility for the code would normally set their activity trace flags on, while others having a more peripheral connection would set their flags off. A programmer could override this setting manually when invoking the debugger. A programmer might also wish to vary the setting depending on the development phase. For example, at very early stages of development, when code is extremely unstable, the programmer may wish to turn off the activity trace flag. Additionally, at some late stage when sufficient debug activity data has been gathered, the developers may wish to turn off further tracing of debug activity.

As a further option, instead of or in addition to a binary activity trace flag which is either on or off, a weighting factor might be associated with each programmer or other user, so that debug activities performed by certain users have greater significance to the compiler. The weighting factor could be, e.g., as simple integer coefficient, by which any recordable debug events are multiplied when recorded in debug activity data counters 304-307 and 309. For example, the programmer having primary responsibility for the module involved would typically have the highest weighting factor, so that his debug activities would assume greater importance. At various intermediate levels of importance might be other programmers on the development team. At a relatively lower level of importance may be field service personnel, developers associated with other projects, and so forth. At some level, the weighting factor of a user might drop to zero, which is the same as turning the activity trace flag off.

If the activity trace flag is set on, the "Y" branch is taken from step 407. In this case, three lists used for accumulating debug activity data, herein designated List-S, List-CV, and List-V, are initialized to null (step 408). The break counter 304 or the exception counter 306 corresponding to the component in which the break or exception occurred, as the case may be, is then incremented to record the event which caused the debugger to be invoked (step 409). In a simple embodiment, the appropriate counter is incremented by one or some other fixed amount. Optionally, it would be possible to increment by a weighting factor associated with the user on whose behalf the debugger is invoked, as explained above.

The debugger then displays debug information such as source code and program state information to the user (step 410). The information displayed may be any information displayed by conventional debuggers, and preferably includes source code at the break or exception point. In the preferred embodiment, the value of declared variables is not displayed without further action from the programmer, although the programmer is allowed to select variables for display. This interaction allows programmer selections to be traced. The debugger then waits at tight loop step 411 for an interactive command from the user.

The debugger may support any number of interactive commands from the user, but in particular it preferably supports a step command and a view variable command. If the step command is input (the "Y" branch from step 415), the debugger causes the program to execute the equivalent of one source code statement and stop (step 416). If activity trace flag is off (the "N" branch from step 417), the debugger then returns to step 410, displays current state, and again waits for a command from the programmer. When stepping, it is common for the programmer to execute the step command multiple times to observe program behavior while stepping through various source code statements. If the activity flag is on when stepping, the "Y" branch is taken from step 417. The activity tracer 213 then determines whether the current component (i.e., in the preferred embodiment, the procedure in which the current source code statement is located) is contained on List-S (step 418). List-S is simply a list of all procedures stepped through during stepping operation in the debugger. If the current component is not on List-S (the "N" branch from step 418), it is appended to List-S (step 419). In either case, the debugger returns to step 410 to display current program state and await the next user command.

If a view variable command is input, the "Y" branch is taken from step 420. A view variable command is a command to display the state of a particular variable in the program being analyzed. The variable could be a scalar value, or a more complex data structure. The debugger responds by displaying the value (step 421). If the activity trace flag is off (the "N" branch from step 422), the debugger then returns to step 410 to await the next command. If the flag is on, the "Y" branch is taken from step 422. The activity tracer 213 then determines whether the current component is on List-CV (step 423). List-CV is a list of all components (preferably procedures) for which the programmer requested to see the value of at least one variable during debug. If the current component is not on List-CV (the "N" branch from step 423), it is added to List-CV (step 424); otherwise step 424 is bypassed. The activity tracer then determines whether the variable selected by the programmer is on List-V (step 425). List-V is a list of all variables selected by the programmer for display during debug. If the selected variable is not on List-V, it is added to List-V (step 426). In either case, the debugger then returns to steps 410 and 411, to await the next command.

If the command from the programmer was neither a step command nor a view variable command, the "N" branch is taken from step 420 to step 430. If the command was anything other than an exit or resume program command, the "N" branch is taken from step 430, and the debugger performs the action corresponding to the command received (step 431). If the command was an exit or resume program command, the "Y" branch is taken from step 430. If the activity trace flag is on (step 432), the activity tracer then updates step counters 305 and variable visualization counters 307, 309. Specifically, for each component on List-S, the step counter 305 in the component optimization record 301 corresponding to the component is incremented (step 433). For each component on List-CV, the variable visualization counter 307 in the component optimization record 301 corresponding to the component is incremented (step 434). For each variable on List-V, the variable visualization counter 309 of the variable is incremented (step 435). As in the case of the break point counter 304 and the exception counter 306, the increment could be one or some other fixed amount, or could be some weighting factor associated with the user. The debug session associated with a particular break point or exception is then finished, and the debugger then either terminates or causes the program to resume execution, as requested by the programmer.

Recent debug activity is more compelling evidence of likely future debug activity than is debug activity occurring remotely in the past. Accordingly, in the preferred embodiment the counter values in selective optimization data (i.e., the values of counters 304, 305, 306, 307 and 309) are periodically aged, so that more recent activity assumes a greater relative importance. A simple and effective form of aging is to multiply the values by some positive constant less than 1, e.g., by 0.5. An aging process checks the value of aged date 310 in selective optimization data 206. If the amount of time since the last aging exceeds some threshold, the data is aged by multiplying all counters 304, 305, 306, 307 and 309 by the predetermined aging constant, and the aged date 310 is then reset to the current date/time. The aging process could be triggered every time the debugger is invoked, or every time the compiler is invoked, or on some other basis.

Where a new component (such as a new procedure) is added to the source code, or where an existing procedure is broken into multiple procedures, or multiple existing procedures combined to form a new procedure, it may not always be possible to map the new procedure or procedures to existing counter values in component optimization data. Execution time 308 can be determined by simply re-executing simulated program instances to re-generate the execution time data. Debug activity can not be so easily determined for new procedures. In this case, assumed values may be entered into the counters of new procedures. These assumed values should be higher than average counter values, on the assumption that a new procedure is likely to require more maintenance than a previously existing procedure. Assumed values might be fixed, or might be computed by taking averages of existing values from all the procedures. For example, assumed values could be set at one standard deviation above the mean for each respective counter. Because the counter values are aged, they should eventually approach realistic values even where the assumed value is too high or too low.

Figure 5A:
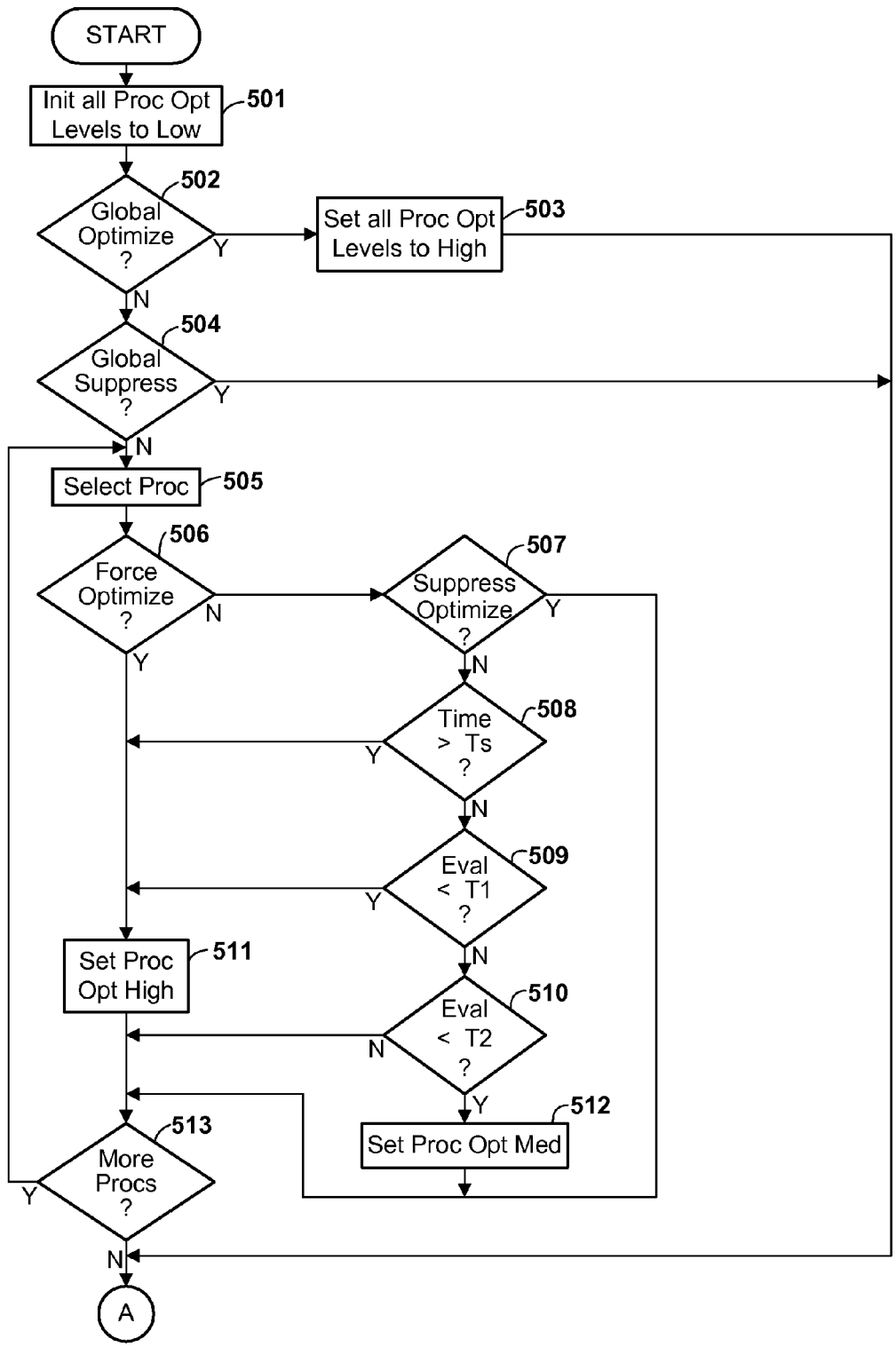
FIGS. 5A and 5B (herein collectively referred to as FIG. 5) are a high-level flow diagram showing a compilation process which selectively optimizes components of a module, according to the preferred embodiment.
Figure 5B:
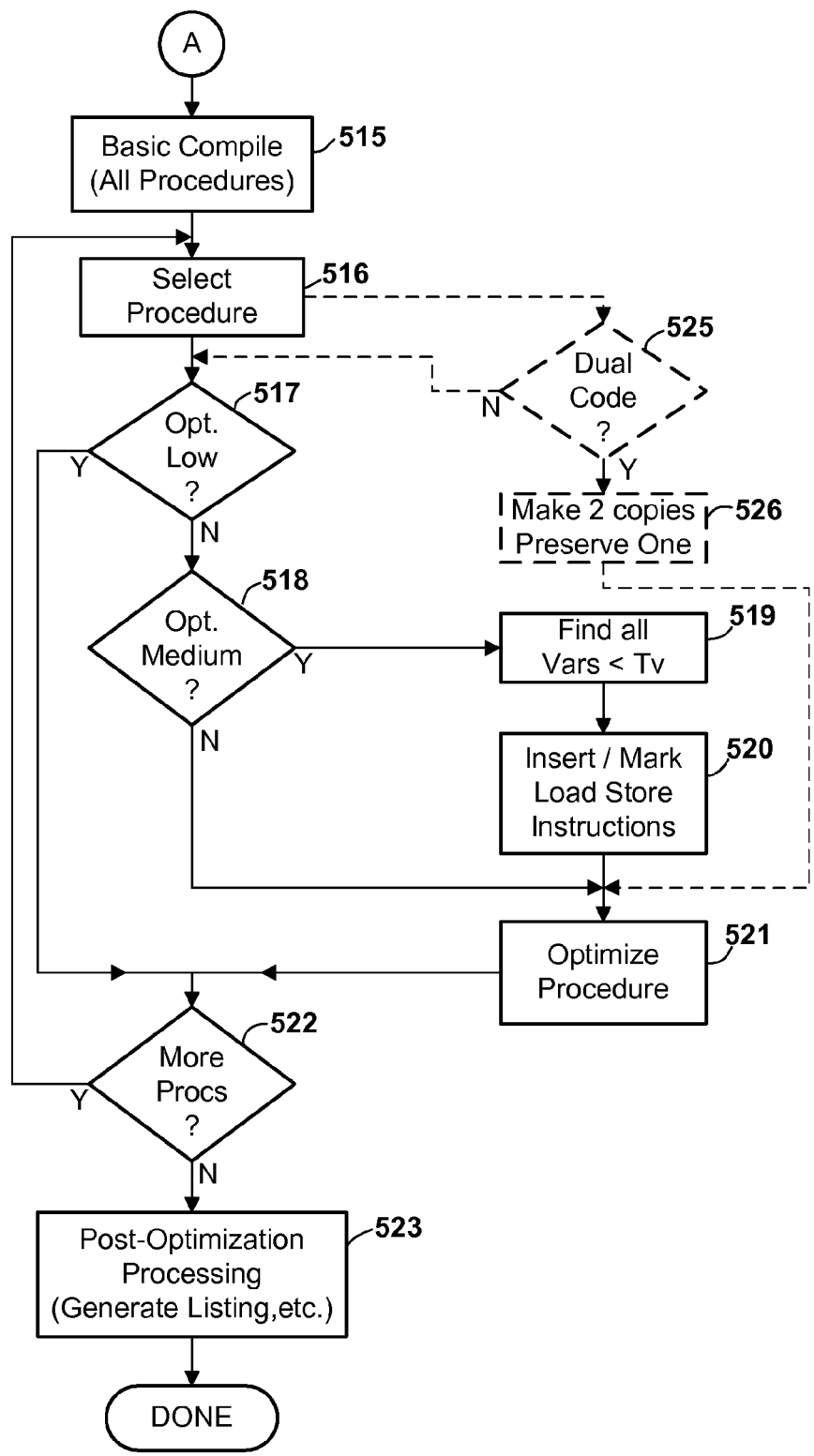

In accordance with the preferred embodiment, selective optimization data 206 is input to the back-end (optimizing) compiler along with the intermediate code representation and other necessary data, and is used to selectively optimize component portions of the code. In the preferred embodiment, these component portions are procedures, but selective optimization could be performed on different component units, such as basic blocks. FIGS. 5A and 5B (herein collectively referred to as FIG. 5) are a high-level flow diagram showing a compilation process which selectively optimizes components of a compilable module, according to the preferred embodiment.

Referring to FIG. 5, a respective optimization level is assigned to each component (procedure) of the compilable code module. Component optimization selector 216 within compiler 215 initializes the optimization level of each procedure to "Low", meaning that little or no optimization is to be performed (step 501). When back-end compiler 215 is invoked by a programmer, the programmer has the option to specify maximum optimization, minimum optimization, or selective optimization. If maximum optimization is specified, the "Y" branch is taken from step 502, and component optimization selector 216 sets the optimization level of each procedure to "High" (step 503). If minimum optimization is specified, the "Y" branch is taken from step 504; in this case, steps 505-513 are by-passed, leaving all procedures at the initial "Low" optimization value.

If neither maximum nor minimum optimization was specified by the programmer (i.e., selective optimization is chosen, either explicitly or implicitly by default), the "N" branch is taken from step 504. In this case, the component optimization selector 216 selects a procedure within the code for individual optimization determination (step 505).

If the force optimization flag 302 in the component optimization record 301 corresponding to the selected procedure is set on, the "Y" branch is taken from step 506, and the optimization level of the selected procedure is set to "High" (step 511). If flag 302 is not set, the "N" branch is taken from step 506 to step 507. In this case, if the suppress optimization flag 303 in the component optimization record 301 corresponding to the selected procedure is set on, the "Y" branch is taken from step 507 to step 513, and no further analysis is performed with respect to the selected procedure, allowing its optimization level to remain at "Low".

If nether flag 302 nor flag 303 is set, the "N" branch is taken from step 507. In this case, component optimization selector 216 determines whether execution time from field 308 exceeds an execution time threshold designated $T_S$ (step 508). This test is designed to force optimization of those few procedures, if any, which consume relatively large amounts of execution time. If the $T_S$ threshold is exceeded, the "Y" branch is taken from step 508, and the optimization level of the selected procedure is set to "High" (step 511). Otherwise, the "N" branch is taken for further analysis.

Component optimization selector 216 then generates an evaluation function of various input values from component optimization record 301. In the preferred embodiment, the evaluation function is of the form:

$$Eval = \frac{K_{BRK} * \text{Brk\_Cnt} + K_{STEP} * \text{Step\_Cnt} + K_{EXCP} * \text{Excp\_Cnt} + K_{VAR} * \text{Var\_Cnt}}{\text{Ex\_Time}}$$

where Brk_Cnt is the break counter value from field 304, Step_Cnt is the step counter value from field 305, Excp_Cnt is the exception counter value from field 306, Var_Cnt is the variable visualization counter value from field 307, and Ex_Time is the execution time value from field 308, of the component optimization record 301 corresponding to the selected component, i.e., procedure; and $K_{BRK}$, $K_{STEP}$, $K_{EXCP}$, and $K_{VAR}$ are respective coefficients. The selection of coefficient values is a matter of design choice. In general it is assumed that stepping and variable visualization are more indicative of intensive debug activity than the mere triggering of a break point or exception, and that these coefficients should be higher. Furthermore, it is assumed that a break point is a more significant event than an exception from the standpoint of debug activity, so the break point coefficient should be higher than the exception coefficient. However, in some environments these guidelines may not be true, and the designers may wish to use different relative values. Furthermore, it will be understood that while an exemplary evaluation formula is disclosed herein as a preferred embodiment, different formulae or methods for making a selective optimization decision could be used, which could use other or additional input data, and which may or may not use debug activity data. For example, the time elapsed since most recent change to the source code of a procedure, or the number of historical changes to the procedure, might be used as indicative of a need for debug capability.

If the evaluation function evaluates to a value below an initial threshold designated $T_1$, then the "Y" branch is taken from step 509 and the optimization level of the procedure is set to "High" (step 511). A low evaluation score indicates some combination of low debug activity as expressed by the numerator in the evaluation function, and/or high execution time, either of which suggests that the corresponding procedure should be fully optimized. If the evaluation score is at least $T_1$, but less than a second threshold designated $T_2$, then the "Y" branch is taken from step 510, and the optimization level of the procedure is set to "Medium" (step 512). If the evaluation score is greater than or equal to T2, the "N" branch is taken from step 510 to step 513, causing the optimization level of the selected procedure to remain at the initial value of "Low".

A "Medium" optimization level is optional, and in one embodiment, thresholds $T_1$ and $T_2$ could be equal, with the result that optimization level is either "High" or "Low", but not "Medium".

After optimization level of the selected procedure is determined as described above with respect to steps 506-512, if there are more procedures to be examined, the "Y" branch is taken from step 513 to step 505, where the next procedure is selected. When the optimization levels of all procedures have been determined, the "N" branch is taken from step 513.

Having determined the optimization level of each component (procedure) within the compilable module, compiler 215 then compiles and optimizes the intermediate representation 204 into object code representation 209. In general, optimization is performed late in this process, and is performed at the finest level (the level of a source statement) first, gradually optimizing larger portions of the code. As illustrated in FIG. 5, compiler 215 performs basic compilation of all procedures (step 515). The only optimizations performed at this step are source statement level optimizations, i.e., within a single source statement, the various object code instructions may be optimized. This is a very limited form of optimization, which does not affect the ability to debug the code, and hence is regarded as equivalent to "Low" or no optimization.

Having completed compilation and optimization at the basic level, the compiler selects a procedure for higher level optimization (step 516). If the optimization level of the selected procedure is "Low", the "Y" branch is taken from step 517 to step 522, and no further optimizations are performed on the procedure.

If the optimization level of the selected procedure is "Medium", the "Y" branch is taken from step 518. In the preferred embodiment, a "Medium" level of optimization means that standard procedure-level optimizations can be performed, but loads and stores are inserted for key variables which have the effect of disabling some optimizations. Specifically, the compiler finds all variables within the procedure, for which the variable visualization counter field 309 corresponding to the variable exceeds some threshold $T_V$ (step 519). These are key variables which the programmer has frequently examined during debug operations. As to any such variables, the compiler either inserts instructions forcing the loading and storing of these variables from/to memory whenever they are referenced, or marks existing instructions so that they can not be removed by optimization (step 520). These loads and stores guarantee that the values of the key variables will be visible in debug operations. They also have the effect of inhibiting some other optimizations near the references to the key variables, i.e., rearranging the order of instructions may not be possible due to the loads and stores. However, they do not necessarily prevent all procedure-level optimizations or optimizations at a level higher than a source statement, and therefore the level optimization achieved is something between that of full procedure level optimization and no or "Low" optimization.

The compiler then performs full procedure-level optimization (step 521). This full procedure optimization is performed on the unmodified procedure (in the case of a "High" optimization level, being the "N" branch from step 518) or on the procedure as modified to preserve visualization of key variables (in the case of the "Y" branch from step 518).

If more procedures remain to be optimized, the "Y" branch is taken from step 522 and the next procedure is selected at step 517. When all procedures have been optimized, the "N" branch is taken from step 522. The compiler then performs any post-procedure optimization processing to complete the compilation process (step 523), such as packaging the compiled module 209, generating listing 210, etc.

In the procedure described above, it is assumed that the compiler must decide, with respect to each component, a single optimization level, and produce a single compiled portion corresponding to that level. In some circumstances, it may be desirable to create dual sections of code, one optimized and the other not. For example, where a particular code component has both a high level of debug activity and a long execution time, it is difficult to achieve a good compromise between the goals of serviceability and performance. In this case, the compiler could generate dual components, which are selectively called depending on the value of some system variable, so that users would generally invoke the optimized version, but the non-optimized version would always be available for debug operations.

This optional dual code generation is represented in FIG. 5 by steps 525 and 526. Specifically, instead of a direct path from step 516 to 517, a decision is made at step 525 whether the selected procedure qualifies for dual code generation. Typically, dual code generation is indicated where both debug activity are high (indicating a high need for serviceability) and execution time is long (indicating a high need for performance optimization). This test should be performed separately from the formula described above for selective optimization; in fact, the optimization level of code selected for dual code generation could be low, medium or high. In one embodiment, the numerator of the Eval expression described above is compared with a first threshold, and the denominator of the Eval expression is compared with a second threshold, and if both values exceed their respective thresholds, then dual code generation is indicated. If dual code generation is indicated, the "Y" branch is taken from step 525, and two separate copies of the basic compiled code are generated (step 526). One of these copies is preserved without further optimizations, while the other is allowed to be optimized at step 521.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as system memory 102, and as data storage devices 125-127.

Additional Variations

Various alternatives, enhancements and extensions are possible within the scope of the present invention. Certain alternatives are mentioned herein by way of example, it being understood that the examples described herein are by way of illustration and not limitation.

Different forms of debug activity information can be collected and used in selective optimization decisions. Specific source code statement locations may be of interest, such as the locations of breakpoints, and the locations at which variables are visualized during debug operations. If a variable has been frequently accessed within the debugger at a particular location, then the variable can be loaded or stored whenever it is referenced near that location. It may also be desirable to load/store all variables near frequently used breakpoint locations. Additional code optimizations, such as removal of unused branches, might be suppressed at a common breakpoint location. The same principle might be applied to code locations at which frequent exceptions occur.

When an exception occurs, it may be desirable to record information in addition to the exception location. Specifically, an exception occurring at a specific code location normally causes an exception handler (which may be a separate procedure, or may simply be a block of code which is jumped to whenever the exception occurs) to execute. It may be desirable to know both the exception handling location as well as the original code location at which the exception occurred. In this case, separate counters could be allocated in debug activity data 207 for the exception location and the location of the exception handler. It may also be useful to know which procedures are on the call stack when an exception is triggered, and a separate counter could be used for this purpose; in general, procedures closer to the procedure which caused the exception will be of greater interest, and closer procedures could be weighted accordingly.

In the preferred embodiment described above, it is assumed that the debug activity data comes from development activities, either on a single system or on a collection of systems accessing some common debug activity data record. But it would alternatively be possible to collect data on a much wider scale. For example, statistics regarding exceptions occurring in user installations can be collected and added to the debug data. While such exceptions don't, strictly speaking, directly cause debug activity, they are a good indication of probable instability in some portions of the code, and therefore a good indication of probable future need for debug capability. It would be possible to use a relatively low weighting factor as discussed above for any debug activity outside the development environment, so that such activity does not overwhelm the significance of development debug activity.

Although selective optimization techniques have been described herein as applicable to a back-end compiler, it may also be possible to perform some forms of optimization in the front-end compiler based on selective optimization data, and in particular, based on debug activity data. For example, in-lining of frequently called procedures might be performed by the front-end compiler, based at least in part on the need to debug certain code.

A selectively optimizing compiler in accordance with the present invention may contain various options for selecting an optimization level, which could be tailored to the development environment. Specifically, at an early stage of development, a programmer will typically want to turn off all optimizations, so that defects found in the code can be readily diagnosed and corrected. As the code gradually becomes more stable, the programmer may enable selective optimization as described herein. Specifically, when initial versions of the code are distributed to end users, the programmer will typically want some optimization in order to improve performance, but will also want some degree of serviceability, since new code often has some undiscovered defects. After the code has been in use by end users for some time, and initial defects are corrected, the programmer may wish to optimize all code portions. There could be multiple intermediate levels of optimization.

In the preferred embodiment, selective optimization data includes both debug activity data and execution profile data. However, in an alternative embodiment, selective optimization data might include only execution profile data, or only debug activity data, or might include some other form of selective optimization data. An example of another form of selective optimization data is historical data regarding code changes. The number of times a particular section of code has been changed is a general indication of the stability of that section of code and the need for future debug activity, and therefore historical code changes could also be used, either in addition to or instead of, certain selective optimization data described above with respect to the preferred embodiment.

Although a specific embodiment of the invention has been disclosed along with certain alternatives, it will be recognized by those skilled in the art that additional variations in form and detail may be made within the scope of the following claims:

What is claimed is:

1. A method for compiling computer programming code, comprising the steps of:

generating a compilable source module, said compilable source module containing a plurality of discrete component portions;

generating selective optimization data, said selective optimization data including a plurality of selective optimization data portions, each of said plurality of selective optimization data portions corresponding to a respective component portion of said plurality of discrete component portions; and compiling said compilable source module with an automated compiler separate from execution of computer programming code represented by instructions in said compilable source module to produce an executable module for execution subsequent to said generating selective optimization data step and said compiling step, wherein said compiling step comprises the following steps performed by said automated compiler:

(a) with respect to each of said plurality of discrete component portions, selectively determining whether to optimize the respective discrete component portion using said selective optimization data portion corresponding to the respective discrete component portion;

(b) with respect to at least one discrete component portion of a first subset of said plurality of discrete component portions, said first subset containing the discrete component portions for which said selectively determining step determined to optimize the respective discrete component portion, performing at least one optimization upon the respective discrete component portion responsive to said selectively determining step; and (c) with respect to at least one discrete component portion of a second subset of said plurality of discrete component portions, said second subset containing the discrete component portions for which said selectively determining step determined to not optimize the respective discrete component portion, compiling the respective discrete component portion without performing at least one optimization which said automated compiler has the capability to automatically perform on the respective discrete component portion.

2. The method for compiling computer programming code of claim 1, wherein said respective discrete component portion is a procedure.

3. The method for compiling computer programming code of claim 1, wherein said selective optimization data comprises data concerning debug activity occurring with respect to each of said plurality of discrete component portions.

4. The method for compiling computer programming code of claim 1, wherein said selective optimization data comprises data concerning execution time with respect to each of said plurality of discrete component portions.

5. The method for compiling computer programming code of claim 1, wherein said selective optimization data comprises a plurality of optimization flags, each optimization flag corresponding to a respective component portion of said plurality of discrete component portions.

6. The method for compiling computer programming code of claim 1, wherein said compiling step comprises, with respect to a first discrete component portion, but not with respect to all said discrete component portions, generating alternative compiled versions of the first discrete component portion, wherein a first alternative version of said first discrete component portion is produced by performing a first optimization, and a second alternative version of said first discrete component portion is produced without performing said first optimization.

7. The method for compiling computer programming code of claim 1, wherein:
said step (a) comprises, with respect to each of said plurality of discrete component portions, determining a corresponding optimization level from among at least three distinct optimization levels, wherein the optimization performed at a first level are greater than the optimizations performed at a second level, and the optimizations performed at a second level are greater than the optimizations, if any, performed at a third level; and
said step (b) comprises performing optimization on each respective discrete component portion according to its corresponding optimization level.

8. A computer program product for compiling computer programming code, comprising:
a plurality of executable instructions recorded on non-transitory computer-readable media, wherein said plurality of executable instructions, when executed by at least one processor of a digital computing device, cause the digital computing device to perform the steps of:
receiving a compilable source module, said compilable source module containing a plurality of discrete component portions;
receiving selective optimization data, said selective optimization data including a plurality of selective optimization data portions, each of said plurality of selective optimization data portions corresponding to a respective component portion of said plurality of discrete component portions; and
compiling said compilable source module with an automated compiler separate from execution of computer programming code represented by instructions in said compilable source module to produce an executable module for execution subsequent to said receiving selective optimization data step and said compiling step, wherein said compiling step comprises:

(a) with respect to each of said plurality of discrete component portions, selectively determining whether to optimize the respective discrete component portion using said selective optimization data portion corresponding to the respective discrete component portion;

(b) with respect to at least one discrete component portion of a first subset of said plurality of discrete component portions, said first subset containing the discrete component portions for which said selectively determining step determined to optimize the respective discrete component portion, performing at least one optimization upon the respective discrete component portion responsive to said selectively determining step; and (c) with respect to at least one discrete component portion of a second subset of said plurality of discrete component portions, said second subset containing the discrete component portions for which said selectively determining step determined to not optimize the respective discrete component portion, compiling the respective discrete component portion without performing at least one optimization which said automated compiler has the capability to automatically perform on the respective discrete component portion.

9. The computer program product of claim 8, wherein said respective discrete component portion is a procedure.

10. The computer program product of claim 8, wherein said selective optimization data comprises data concerning debug activity occurring with respect to each of said plurality of discrete component portions.

11. The computer program product of claim 8, wherein said selective optimization data comprises data concerning execution time with respect to each of said plurality of discrete component portions.

12. The computer program product of claim 8, wherein said selective optimization data comprises a plurality of optimization flags, each optimization flag corresponding to a respective component portion of said plurality of discrete component portions.

13. The computer program product of claim 8, wherein said compiling step comprises, with respect to a first discrete component portion, but not with respect to all said discrete component portions, generating alternative compiled versions of the first discrete component portion, wherein a first alternative version of said first discrete component portion is produced by performing a first optimization, and a second alternative version of said first discrete component portion is produced without performing said first optimization.

14. The computer program product of claim 8, wherein:
said step (a) comprises, with respect to each of said plurality of discrete component portions, determining a corresponding optimization level from among at least three distinct optimization levels, wherein the optimization performed at a first level are greater than the optimizations performed at a second level, and the optimizations performed at a second level are greater than the optimizations, if any, performed at a third level; and said step (b) comprises performing optimization on each respective discrete component portion according to its corresponding optimization level.

* * * * *